(12) United States Patent
Kobayashi (10) Patent No.: US 6,278,672 B1
(45) Date of Patent: Aug. 21, 2001

(54) OPTICAL DISC DISCRIMINATING DEVICE, OPTICAL DISC REPRODUCING DEVICE AND DISCRIMINATING METHOD

(75) Inventor: Yoshihiro Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/320,278

(22) Filed: Jun. 2, 1999

(30) Foreign Application Priority Data

Jun. 3, 1998 (JP) .................................................. 10-154450

(51) Int. Cl.[7] ...................................................... G11B 3/90
(52) U.S. Cl. .................................... 369/53.23; 369/44.25; 369/44.27
(58) Field of Search .............................. 369/44.25, 44.26, 369/44.27, 44.29, 47.55, 53.22, 53.2, 53.23, 53.37, 94, 124.15

(56) References Cited

U.S. PATENT DOCUMENTS 5,959,955 * 9/1999 Choi .................................... 369/53.23
6,147,941 * 11/2000 Kumagai ............................. 369/44.26

* cited by examiner

*Primary Examiner*—Paul W. Huber
(74) *Attorney, Agent, or Firm*—Ronald P. Kananen; Rader, Fishman & Grauer (57) ABSTRACT

An optical pickup provided opposed to an optical disc D is moved in the optical axis direction with a drive signal from a focus search circuit to detect, with an amplitude detecting circuit, the character "S" shape waveform of large amplitude corresponding to the recording surface of optical disc of the focus error signal FE obtained from the optical pickup and such detected output is counted by a counter. When the character "S" shape waveform of large amplitude appears twice, an interval thereof is measured with a time measuring circuit and width of interval is detected with an interval detecting circuit. The counted value of counter and detected output of the interval detecting circuit are supplied to a microcomputer to automatically detect a type of optical disc. Thereby, a reproducing device which can be used for a plurality of reflection type optical discs may be structured.

13 Claims, 5 Drawing Sheets

| COUNTER VALUE | PULSE INTERVAL | RESULT OF DISK DISCRIMINATION |
|---|---|---|
| n = 0 | — | OPTICAL DISK IS NOT LOADED |
| n = 1 | — | ORDINARY CD OR SINGLE SURFACE, SINGLE LAYER DVD |
| n = 2 | NARROW | SINGLE SURFACE, DOUBLE LAYER DVD |
| | WIDE | SUPER AUDIO CD |

FIG. 6

| | CD COMPATIBLE LAYER | HIGH DENSITY LAYER |
|---|---|---|
| REFLECTIVITY | TOTAL REFLECTION | SEMI-TRANSMITTING PROPERTY |
| CAPACITY | 780MB | 4700MB |
| MINIMUM PIT/LAND LENGTH | 0.83 $\mu$m | 0.40 $\mu$m |
| TRACK PITCH | 1.6 $\mu$m | 0.74 $\mu$m |
| LASER WAVELENGTH | 780nm | 650nm |
| PU LENS APERTURE RATE | 0.45 | 0.60 |

OPTICAL DISC DISCRIMINATING DEVICE, OPTICAL DISC REPRODUCING DEVICE AND DISCRIMINATING METHOD

BACKGROUND OF THE INVENTION

1. Field of the Invention

The present invention relates to an optical disc discriminating device and discriminating method suitable for a single surface reading type optical disc.

2. Description of the Related Art

A compact disc (CD) is formed, as is well known, by recording digital audio signal in the form of physical pits to the single surface of a transparent disc having diameter of 12 (or 8) cm and thickness of 1.2 mm and then evaporating a reflection layer on the recording surface in view of reading the recording surface via a disc with an optical pickup provided opposite to the other surface of disc.

In the CD of the related art, the 16-bit PCM with the sampling frequency of 44.1 kHz has been employed for digital recording.

Therefore, such a CD has a problem that a frequency response of the audio signal has been limited to 20 kHz and it has been difficult to perfectly overcome analog audio sound and flexibility in the manufacturing side and high end audio area.

Considering such background, the applicants of the present invention have proposed a "Super-Audio CD" which has expanded the frequency response of audio signal up to 100 kHz to realize further higher sound quality and assures compatibility to an ordinary CD by introducing, for example, the one bit direct stream digital (DSD) technique with the sampling frequency of 2.8224 MHz.

Figure 5:
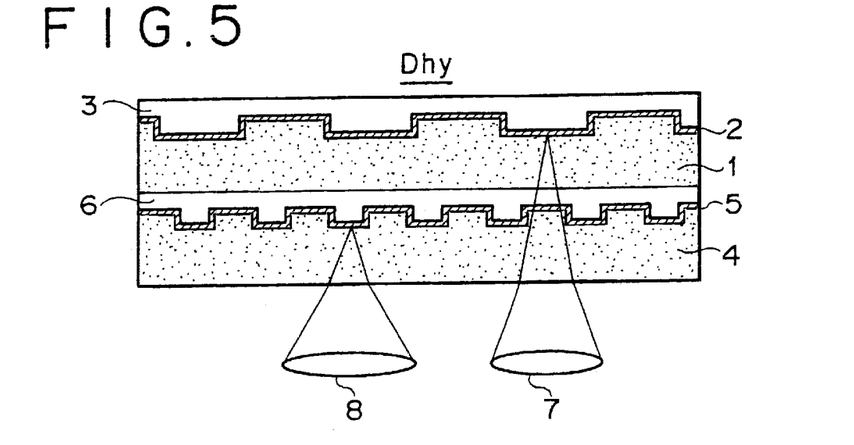
FIG. 5 is a cross-sectional view for explaining the present invention.

This super audio CD is formed, as illustrated in FIG. 5, as a "hybrid disc" in which the substrate of an ordinary CD is divided into two sections in the thickness direction and a high density layer is added to the intermediate part of these two sections.

Namely, as illustrated in FIG. 5, on the upper surface 1 consisting, for example, of polycarbonate resin of the hybrid disc Dhy, a total reflection type CD compatible layer 2 is formed and it is protected by a protection layer 3.

Moreover, to on the lower substrate 4 consisting, for example, of polycarbonate resin, a semi-transmitting high density (HD) layer 5 is formed and it is then adhered with the upper substrate 1 via the protection film 6. As the hybrid disc Dhy, a disc has the thickness of 1.2 mm like the compact disc CD.

The CD compatible layer 2 and high density layer 5 are provided opposed with each other keeping distance of about 0.6 apart mm and these layers are read respectively from the same side (lower side in the figure) with a CD pickup 7 and HD pickup 8.

Specifications of the CD compatible layer 2, high density layer 5, CD pickup 7 and HD pickup 8 explained above are indicated in FIG. 6. As will be understood from FIG. 6, the CD pickup 7 uses an infrared laser beam, while the HD pickup 8 uses red laser beam in the shorter wavelength.

Meanwhile, in these years, a DVD (Digital Versatile Disc) which has outstandingly enhanced the recording density even in the same disc size as CD to realize the recording of compressed moving video information exceeding two hours, for example, with the large capacity of 4.7 GB in a single surface and single layer and its reproducing device have been proposed.

Figure 7A:
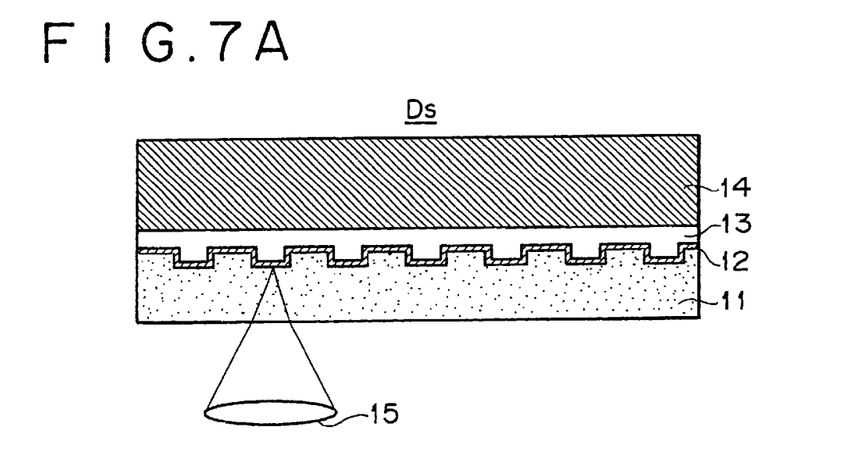
FIGS. 7A and 7B are cross-sectional views for explaining the present invention.

A disc Ds of single surface and single layer type among DVD is formed, as illustrated in FIG. 7A, by recording the compressed moving video information in the form of physical pits to the single surface of the transparent substrate 11 in the thickness of 0.6 mm, evaporating a reflection layer 12 to the recording surface and then adhering the one substrate to the disc 14 of the same thickness via the protection film 13. The recording surface is read via the substrate 11 with an optical pickup 15 provided opposite to the other surface of substrate 11.

Figure 7B:
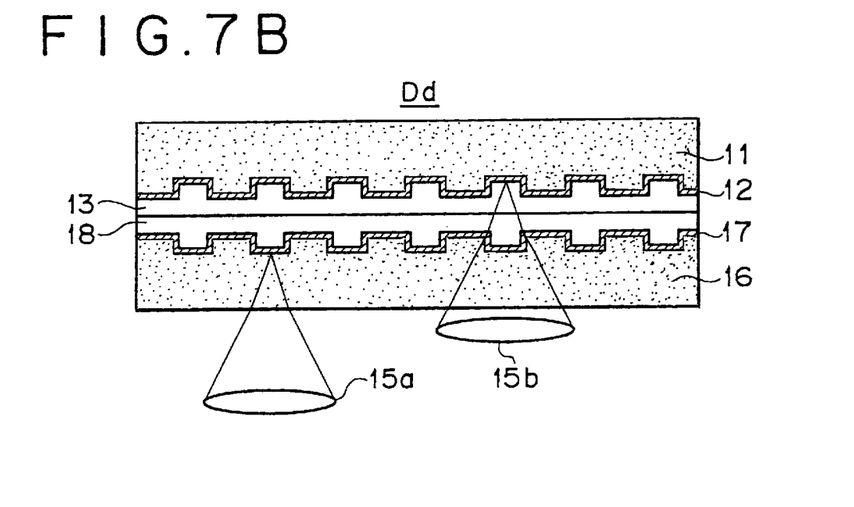

A disc Dd of the single surface, double layer type among DVDs is formed, as illustrated in FIG. 7B, by forming physical pits to the single surface of transparent substrate in the thickness of 0.6 mm, evaporating a reflection layer 12 and then protecting the surface with a protection film 13. Moreover, the physical pits are also formed on one surface of the substrate 1 in the same thickness, a semi-transparent layer 17 is evaporated and it is then protected by a protection film 18. These substrates are adhered in such a manner that both protection layers 13, 18 are provided in contact.

The semi-transparent layer 17 and reflection layer 12 are provided opposed with each other keeping a distance of about several tens of $\mu$m and these layers are read respectively from the same side (lower side in the figure) through the substrate 16 with optical pickups 15a, 15b provided opposed opposite to the other surface of the substrate 16.

Figure 6:
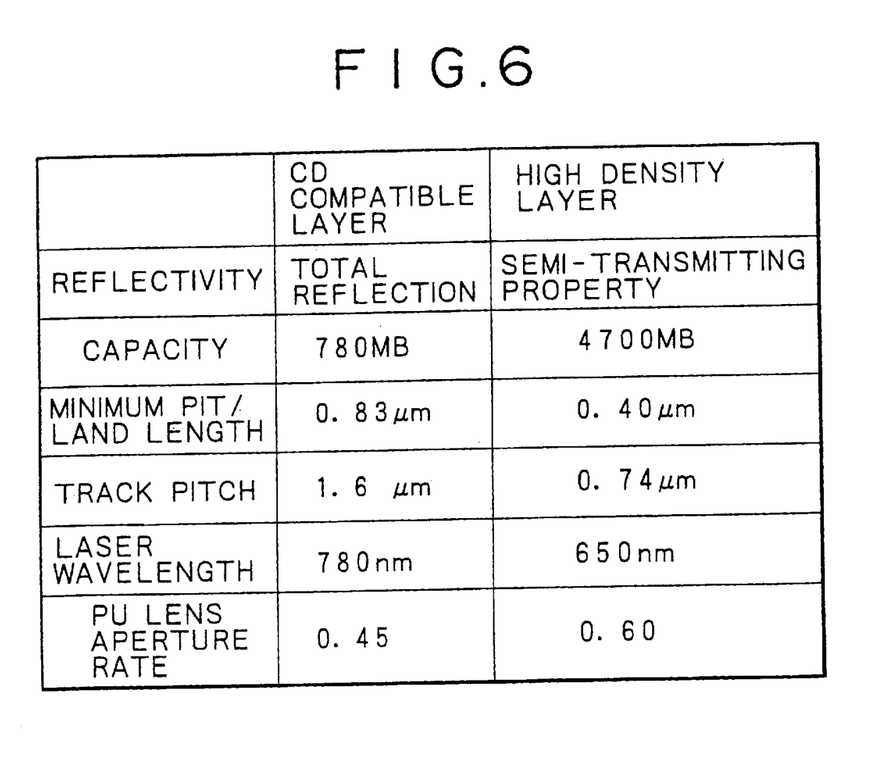
FIG. 6 is a diagram for explaining the present invention.

In the case of single surface and single layer DVD, specifications of the reflection layer 12 and optical pickup 15 are almost the same as those of high density layer 5 and HD pickup 8 as indicated in FIG. 6.

In the case of single surface and double layer DVD, line density is specified to the value reduced by about 10% and its capacity is 8.5 GB in order to compensate for reduction in an amount of reproduced light beam.

A player for reproducing a DVD explained above has an essential condition to reproduce the ordinary CD and an optical pickup having the function assuring compatibility for DVD/CD loaded for the purpose of cost reduction is provided with various devices such as double focusing system using a hologram, objective lens changeover system, aperture limiting system and double laser system.

In the case of reproducing a super audio CD as explained above with a CD player of the related art, the infrared laser beam emitted from the optical pickup loaded to this player is transmitted through a high density layer 5 and is then reflected by the CD compatible layer 2. That is, the recorded data of the CD compatible layer 2 can be read in the same manner as the reproduction of the ordinary CD.

Moreover, in the case of reproducing a super audio CD with a player corresponding to the super audio CD, the red laser beam emitted from the optical pickup loaded to this player is reflected by a high density layer 5 to read the recorded data of the high density layer 5 and thereby the reproduced sound which is remarkably improved in the sound quality than that of the ordinary CD can be obtained.

Here, the player corresponding to a super audio CD is required to be able to reproduce the ordinary CD as in the case of or rather than the DVD player explained above.

Therefore, the player corresponding to the super audio CD is required to discriminate, before the reproducing operation, whether an optical disc loaded is the ordinary CD or super audio CD and automatically select the optimum reproducing circuit and software in view of reproducing the loaded optical disc in the optimum reproducing condition.

Particularly, in the case of loading an optical pickup having the DVD/CD compatible function explained above to reduce the cost of the player corresponding to the super audio CD, it is required to discriminate the loaded optical disc.

SUMMARY OF THE INVENTION

It is therefore an object of the present invention to provide, considering the background explained above, an optical disc discriminating device and method to assure flexibility in use of the reproducing device by automatically discriminating a type of optical disc loaded to the reproducing device compatible to with a plurality of kinds of reflection type optical discs.

DETAILED DESCRIPTION OF THE INVENTION

An optical disc discriminating device of the present invention will be explained with reference to FIG. 1 to FIG. 3 in relation to the embodiment thereof applied to a super audio CD reproducing device.

Figure 1:
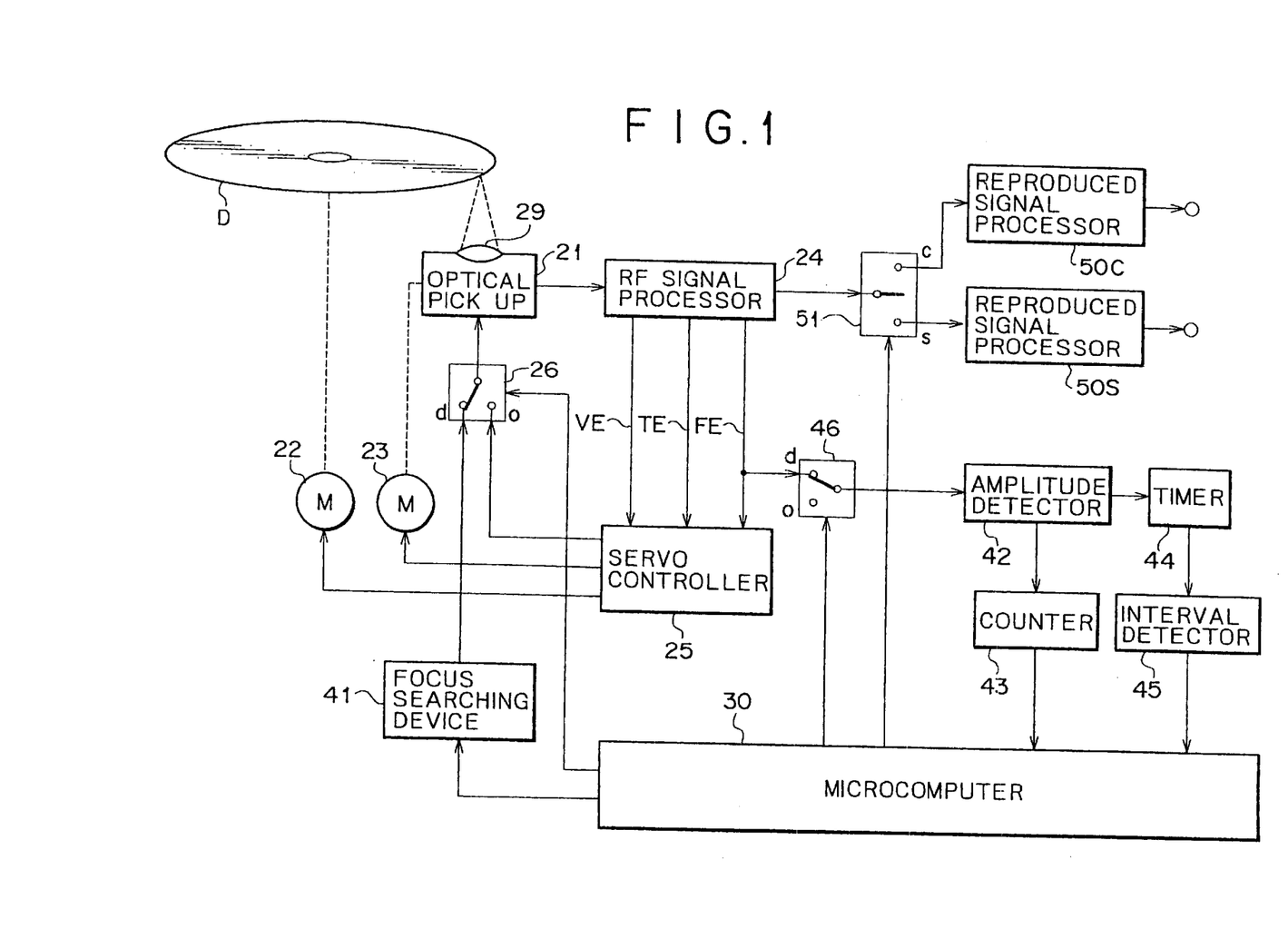
FIG. 1 is a block diagram illustrating a structure of an embodiment of an optical disc discriminating device of the present invention.

A preferred embodiment of the present invention will be illustrated in FIG. 1.

In FIG. 1, an optical disc D is arranged opposed to an optical pickup (PU) 21 and is then driven bya spindle motor 22 and the optical pickup 21 is then moved in the radius direction of disc D with a feed motor 23.

The optical pickup 21 comprises, although not illustrated, a laser diode as a light source, an optical system including an objective lens 29, a photo-detector for receiving the light beam reflected from a disc D and a focus actuator for controlling the position of objective lens in the optical axis direction. As the light source, a couple of light sources are provided respectively for generating the wavelengths suitable for reproduction of ordinary CD and super audio CD and these are selected corresponding to the disc to be reproduced.

The reproducedRF signal from the optical pickup 21 is supplied to the RF signal processing circuit 24 through a preamplifier (not illustrated) and this RF signal processing circuit 24 generates a velocity error signal VE for servo control, a tracking error signal TE and a focus error signal FE and then sends these signals to a servo control circuit 25.

From the servo control circuit 25, the velocity error signal VE in relation to the rotating velocity of spindle motor 22 is supplied to a spindle motor 22, an output corresponding to the tracking error signal TE is supplied to a feed motor 23 and an output corresponding to the focus error signal FE is supplied to a tracking actuator and focus actuator of the optical pickup 21 through the o-side fixed contact and movable contact of the changeover switch 26.

The servo control circuit 25 and changeover switch 26 are controlled by the microcomputer 30 for system control. The changeover switch 26 is set, in the ordinary reproducing mode, to the condition (o-side of the fixed contact) inverted from the condition illustrated in the figure, while in the disc discrimination mode explained later, connected as illustrated in the figure to the d-side fixed contact.

In the embodiment of FIG. 1, since a type of optical disc D is discriminated, the focus search circuit 41, amplitude detecting circuit 42, counter 43, timer circuit 44 and interval detecting circuit 45 and changeover switch 46 are provided. The amplitude detecting circuit 42 and interval detecting circuit 45 are formed by comparator.

An output of the focus search circuit 41 is supplied to a focus actuator of the optical pickup 21 through the d side fixed contact and movable contact of the changeover switch 26.

Moreover, the focus error signal FE from the RF signal process circuit 24 is supplied to the amplitude detecting circuit 42 through the d side fixed contact and movable contact of the changeover switch 46. Here, the d-side fixed contact of the switch 46 is in the non-connecting condition.

A detected output of the amplitude detecting circuit 42 is supplied to the counter 43 and also to the timer circuit 44 and the counted value of this timer circuit 44 is then supplied to the interval detecting circuit 45.

Next, the counted value of the counter 43 and detected output of the interval detecting circuit 45 are fetched to the microcomputer 30 for discrimination of a type of optical disc D as will be explained.

In the embodiment of FIG. 1, the reproduced signal process circuit 50C corresponding to the ordinary CD and the reproduced signal process circuit 50S corresponding to high density layer of the super audio CD explained above are provided and an output of the RF signal process circuit 24 is selectively supplied to these reproduced signal process circuits 50C, 50S via the changeover switch 51. This switch 51 is changed over depending on a type of optical disc D with a control signal from the microcomputer 30.

Next, with reference to FIGS. 2A to 2G and FIG. 3, the optical disc discrimination method of the embodiment of FIG. 1 will be explained.

For example, when the power switch of the optical disc reproducing device is turned ON, the reproducing device is set to the disc discriminating mode in which one light source in the optical pickup 21 lights up and the switch 26 is connected to the d side fixed contact as illustrated in the figure.

Figure 2A:
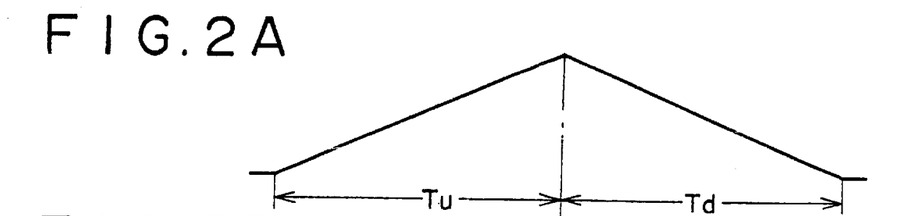
FIGS. 2A to 2G are diagrams illustrating waveforms for explaining disc discrimination of the embodiment of FIG. 1.

Next, a drive signal as illustrated in FIG. 2A is output from the focus search circuit 41 to move vertically in the optical axis direction the objective lens 29 of optical pickup 21 during the periods of Tu and Td. In more detail, during the period Tu, the objective lens of optical pickup 21 moves toward the optical disc and during the period Td, the lens moves far from the optical disc.

Figures 2B, 2C:
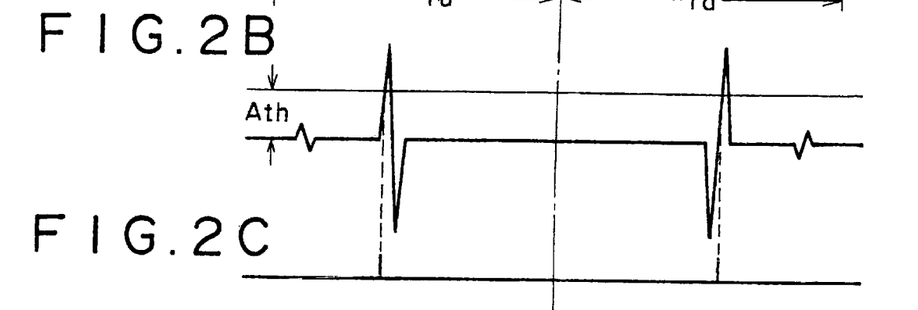
Figure 2D:
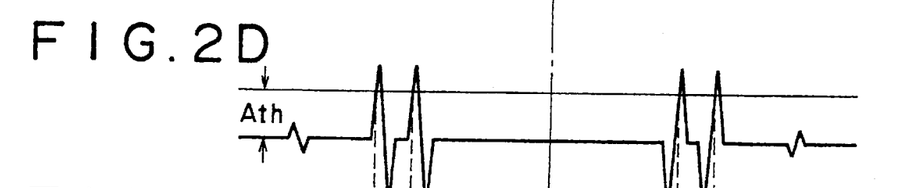
Figure 2E:
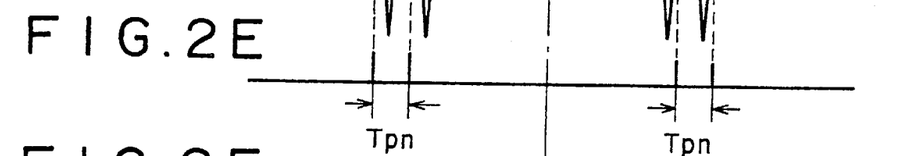
Figure 2F:
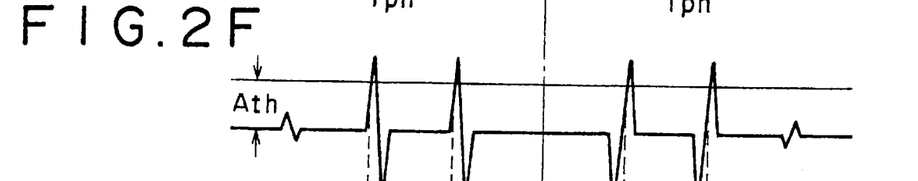

When the optical disc D is loaded, "S"-shape waveforms of small amplitude and large amplitude, as illustrated in FIGS. 2B, 2D, 2F are appearing in the focus error signal FE by reflection from the substrate surface and recording surface of the optical disc due to the movement of the objective lens 29 of the optical pickup 21.

Movement of the objective lens 29 of the optical pickup 21 is continued until the high-amplitude S-shaped waveform corresponding to the CD compatible layer of the ordinary CD or super audio CD appears in the focus error signal FE.

Figure 2G:
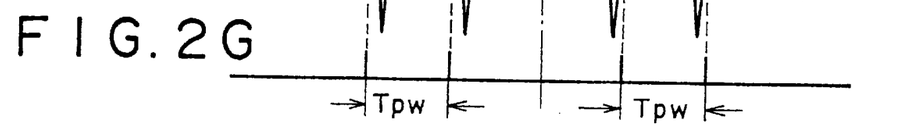

The amplitude detecting circuit 42 sets its reference level to the threshold value Ath which is larger than the small amplitude "C" shaped waveform of the focus error signal FE and generates the pulses as illustrated in FIGS. 2C, 2E, 2G when rising edge of the high-amplitude "S"-shaped waveform of the focus error signal FE exceeds the threshold value Ath.

The counter 43 counts up the pulse output from the amplitude detecting circuit 42 during the period Tu or Td and this counted value is fetched to the microcomputer 30.

As illustrated in FIGS. 2E, 2G, when a couple of pulses corresponding to the two layers of recording surfaces is output from the amplitude detecting circuit 42, time intervals Tpn, Tpw of two pulses are measured by the timer circuit 44 and this measured value is compared with the adequate reference time of the interval detecting circuit 45, in other words, pulse intervals corresponding to the interval of the two layers of recording surfaces are compared and thereby the detected output is fetched by the microcomputer 30.

Figure 3:
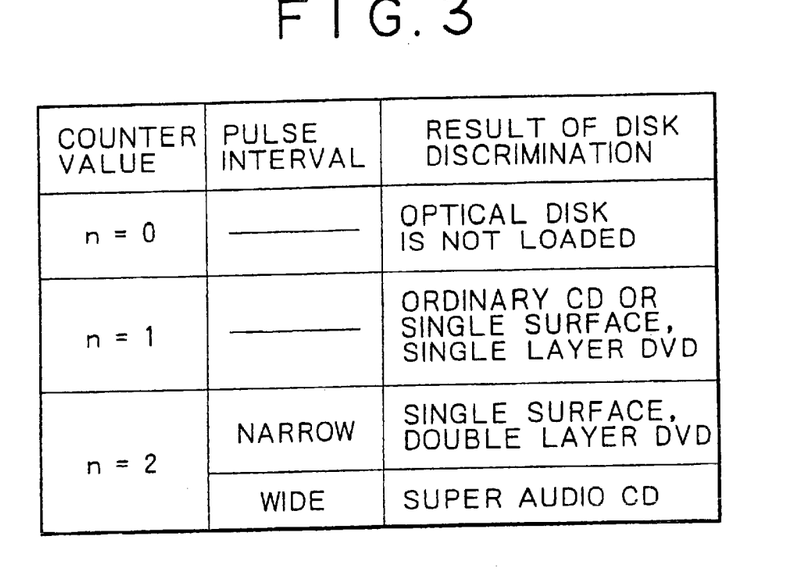
FIG. 3 is a diagram for explaining disc discrimination of the embodiment FIG. 1.

In the microcomputer 30, as illustrated in FIG. 3, a type of optical disc D can be discriminated on the basis of the counted value of counter 43 and width of pulse interval.

As explained above, when discrimination of optical disc is completed, the focus search circuit 41 outputs an ordinary drive signal to move the objective lens 29 of the optical pickup 21 in the optical axis direction. With this movement, the high-amplitude "S" shaped waveform appears in the focus error signal FE.

When it is detected by a computer through the servo control circuit 25 that the momentary level at the center area of the "S" shaped waveform corresponding to the desired recording surface of optical disc is within the predetermined pull-in range, the changeover control signal from the microcomputer 30 is supplied to the switch 26 to connect it to the o-side fixed contact inverted from the position illustrated in the figure. Thereby, an ordinary focus servo loop can be formed.

Moreover, the microcomputer 30 supplies the control signal corresponding to the discrimination result to the servo control circuit 25 in order to conduct the servo control depending on the type of optical disc D.

The changeover control signal from the microcomputer 30 is supplied to the switch 46 to change over it to the condition inverted to the condition illustrated in the figure. Thereby, the amplitude detecting circuit 42 to the interval detecting circuit 45 are set in the non-operating condition.

Moreover, the changeover control signal corresponding to the discrimination result is supplied to the changeover switch 51 from the microcomputer 30, the movable contact is connected to the c-side fixed contact or to the s-side fixed contact, the reproduced signal from the RF signal process circuit 24 is supplied to any one of the circuits of the reproduced signal process circuits 50C, 50S corresponding to the type of optical disc D.

Thereafter, the optical disc discrimination process explained above is repeated for each loading of optical disc D or turning ON of the power switch of the reproducing device.

The changeover switches 41, 51 are provided for the convenience of explanation and actually the detecting circuit 42 to interval detecting circuit 45 are set, in the reproducing mode, to the non-operating condition with the control signal from the microcomputer 30 and the reproduced signal process circuits 50C, 50S are selectively set to the operating condition.

As explained above, in this embodiment, the objective lens 29 of the optical pickup 21 is moved in the optical axis direction with a drive signal from the focus search circuit 41 to count the number of times of appearance of the high-amplitude "S" shaped waveform of the focus error signal FE corresponding to the recording surface of the optical disc D with the counter 43 and when the high-amplitude "S" shaped waveform appears twice, width of the time interval is detected by the interval detecting circuit 45 to automatically discriminate whether the loaded reflection type optical disc D is the ordinary CD or super audio CD. Thereby, reproducing operation can be realized under the optimum condition for the relevant optical disc and flexibility of the reproducing device can be improved.

Other Embodiments

Figure 4:
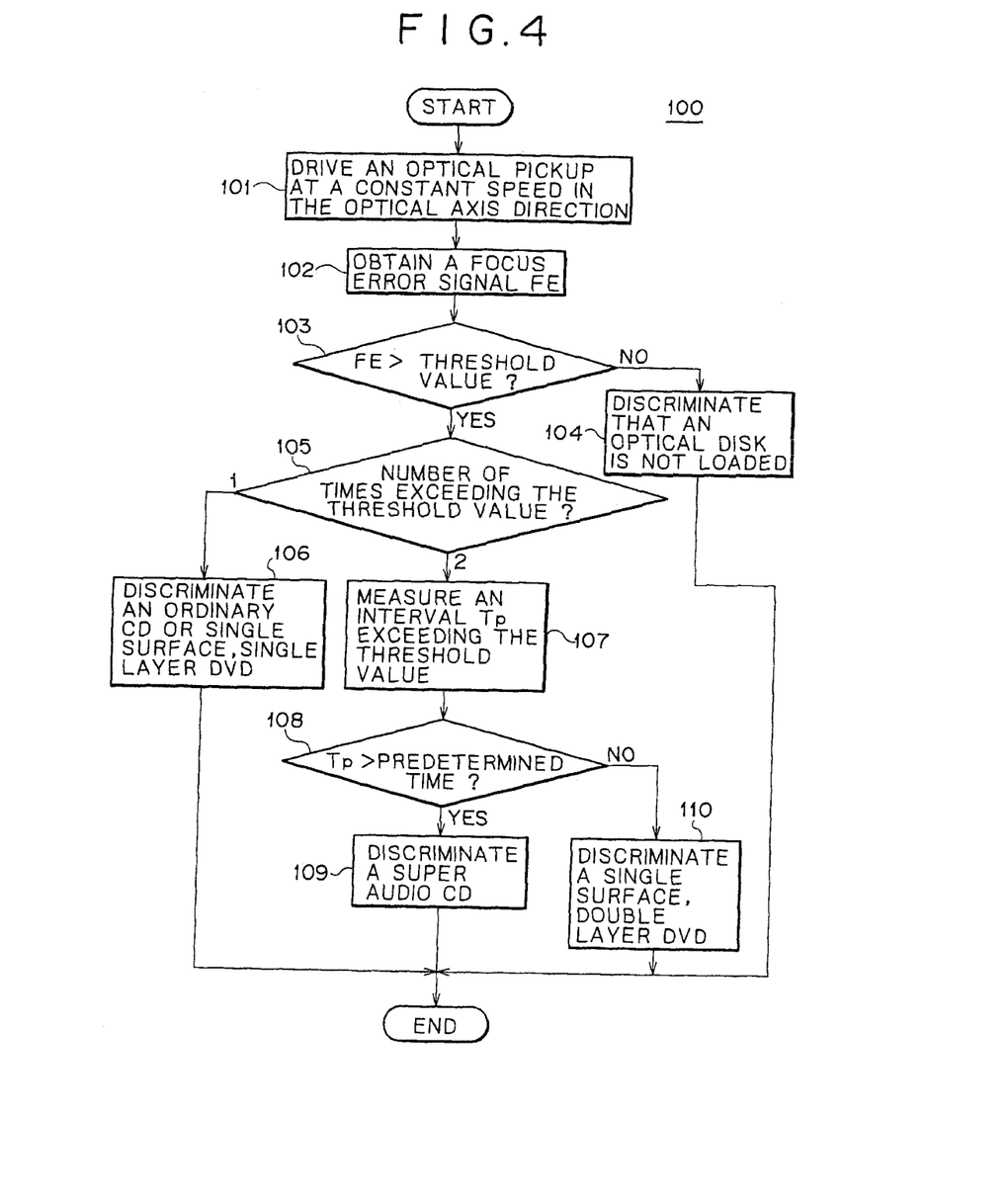
FIG. 4 is a flowchart for explaining disc discrimination of the embodiment of the present invention.

In the embodiment explained previously, a type of optical disc has been discriminated by the hardware such as the focus search circuit or interval detecting circuit but the hardware such as focus search circuit or interval detecting circuit can be realized within the microcomputer with a software and therefore a type of optical disc can also be discriminated even with the optical disc discriminating routine 100 as illustrated in FIG. 4. In this case, such software can be stored in the ROM having necessary capacity.

As explained previously, depending on the turning ON of the power switch of the optical disc reproducing device, when the optical disc discriminating routine 100 illustrated in FIG. 4 starts, the optical pickup is driven at the constant velocity in the optical axis direction in the first step 101 for the purpose of focus search. In the next step 102, a focus error signal FE from the optical pickup is fetched by the microcomputer. In the step 103, it is determined whether the focus error signal FE (having a high-amplitude "S" shaped waveform) illustrated in FIGS. 2B, 2D, 2F has exceeded the threshold value Ath or not.

When the focus error signal FE does not exceed the threshold value Ath in the step 103, it is determined that an optical disc is not loaded in the step 104 and the routine 100 is completed.

Moreover, when the focus error signal FE has exceeded the threshold value Ath in the step 103, the number of times of the focus error signal FE having exceeded the threshold value Ath is determined in the step 105.

When the focus error signal FE has exceeded once the threshold value Ath in the step 105, the process goes to the step 106 to determine that the loaded optical disc is an ordinary CD or single surface DVD having the single reflection layer and completes the routine 100.

When the focus error signal FE has exceeded twice the threshold value Ath in the step 105, an interval Tp when the signal FE has exceeded the threshold value Ath in the step 107 and it is then determined in the next step 108 whether the interval Tp of exceeding the threshold value has exceeded the predetermined time or not.

In the step 108, when the interval Tp of exceeding the threshold value has exceeded the predetermined time, the loaded optical disc is determined in the step 109 to be the super audio CD having the wider interval of two reflection layers and the routine 100 is completed.

Moreover, in the step 108, when the interval Tp of exceeding the threshold value does not exceed the predetermined time, the loaded optical disc is determined in the step 110 to be the single surface double layer DVD having a narrow interval between two reflection layers and the routine 100 is completed.

When the disc type discrimination is executed when the optical disc is loaded, the steps 103 to 104 can be eliminated from the discrimination routine 100.

As explained above, even in this embodiment, a type of reflection type optical disc can be discriminated automatically by moving the objective lens of the optical pickup in the optical axis direction and then detecting the number of times of the focus error signal FE having exceeded the threshold value Ath corresponding to the recording surface of the optical disc and then detecting the width of interval Tp of exceeding the threshold value when the focus error signal has exceeded twice the threshold value. Thereby, reproducing can be realized in the optimum condition for the relevant optical disc and usage flexibility of the reproducing device can be much improved.

As explained above, according to the present invention, a type of reflection optical disc can be discriminated automatically, reproducing operation can be realized in the optimum condition of the relevant optical disc and usage flexibility of the reproducing device can be much improved.

What is claimed is:

1. An optical disc discriminating device for discriminating a type of reflection-type optical disc by reading a light beam reflected from the optical disc with an optical pickup, comprising:

moving means for moving a focus position of a light emitted from said optical pickup in an optical axis directed within a predetermined range;

means for generating a focus error signal based on the movement of the focus position;

amplitude detecting means for detecting if an amplitude of the focus error signal generated by said generating means has exceeded a predetermined threshold value;

counting means for counting a number of outputs from said amplitude detecting means;

time interval measuring means for measuring a time interval of an output of said amplitude detecting means; and interval detecting means for detecting a result of a comparison between the time interval measured by said time measuring means and a predetermined reference time;

whereby the type of reflection-type optical disc can be discriminated on the basis of an output of said interval detecting means and said counting means.

2. An optical disc discriminating device as claimed in claim 1, wherein said moving means is provided with an actuator for moving an objective lens of said optical pickup in the optical axis direction.

3. An optical disc discriminating device as claimed in claim 1, wherein said discriminating device detects a number of layers in a data recording layer of the optical disc depending on the number of outputs from said amplitude detecting means within the predetermined reference time.

4. An optical disc discriminating device as claimed in claim 1, wherein an interval of a plurality of data recording layers on the optical disc is detected on the basis of an output of said interval detecting means.

5. An optical disc reproducing device for discriminating a type of reflection-type optical disc and reproducing data by reading a light beam reflected from an optical disc with an optical pickup, comprising:

moving means for moving a focus position of a light beam emitted from said optical pickup in an optical axis direction within a predetermined range;

means for generating a focus error signal generated by the movement of the focus position;

amplitude detecting means for detecting if an amplitude of the focus error signal generated by said generating means has exceeded a predetermined threshold value;

counting means for counting a number of outputs from said amplitude detecting means;

time interval measuring means for measuring a time interval of an output of said amplitude detecting means; and interval detecting means for detecting a result of a comparison between the time interval measured by said time interval measuring means and a predetermined reference time;

whereby an optical disc is reproduced by discriminating a type of said reflection-type optical disc on the basis of an output of said interval detecting means and said counting means.

6. An optical disc reproducing device claimed in claim 5, further comprising:

a first reproduced signal processing circuit corresponding to a first optical disc type; and a second reproduced signal processing circuit corresponding to a second optical disc type having a higher density than said first optical disc type;

whereby a signal read from the optical disc based on the type of optical disc is processed selectively through said first and second reproduced signal processing circuit.

7. An optical disc reproducing device as claimed in claim 5, wherein said moving means is provided with an actuator for moving an objective lens of said optical pickup in the optical axis direction.

8. An optical disc reproducing device as claimed in claim 5, wherein said device discriminates a type of optical disc by detecting a number of layers in a data recording layer of the optical disc depending on the number of outputs from said amplitude detecting means within the predetermined reference time.

9. An optical disc reproducing device as claimed in claim 5, wherein said discriminating device discriminates a type of optical disc by detecting an interval of a plurality of data recording layers provided on the optical disc on the basis of an output of said interval detecting means.

10. An optical disc reproducing device as claimed in claim 5, further comprising control means for changing over a focus servo control of said optical pickup, wherein a disc is discriminated by moving said focus position in the optical axis direction based on a predetermined focus search condition and wherein the focus servo is conducted on the basis of the focus error signal obtained by detecting light beam reflected from the optical disc.

11. An optical disc discriminating method for discriminating a type of reflection optical disc by reading a light beam reflected from an optical disc with an optical pickup, comprising the steps of:

moving an optical pickup opposite a single surface of said optical disc in the optical axis direction within a predetermined range;

generating a focus error signal based on the movement of the optical pickup;

detecting if an amplitude of the focus error signal has exceeded a predetermined threshold value;

counting a number of times of detection in said detecting step;

measuring a time interval at a time when said amplitude has exceeded said threshold value;

detecting a result of comparison between the measured value of said time interval and a predetermined reference time; and discriminating a type of reflection type optical disc on the basis of said comparison between said measured value of the time interval, the predetermined reference time and said number of times of detection.

12. The method of claim 11, wherein said discriminating step includes the step of detecting a number of layers in a data recording layer of the optical disc depending on the number of outputs from the detecting step within the predetermined reference time.

13. The method of claim 11, further comprising the step of detecting an interval of a plurality of data recording layers on the optical disc on the basis of an output from the comparison between the measured value of the time interval and the predetermined reference time.

* * * * *